Nov. 12, 1968     F. HUF     3,410,254
INNER-AXIAL ROTARY PISTON ENGINE WITH TROCHOIDAL PISTON RUNNER
Filed Aug. 25, 1966     7 Sheets-Sheet 1

INVENTOR
FRANZ HUF
BY *James E. Bryan*
ATTORNEY

Nov. 12, 1968  F. HUF  3,410,254
INNER-AXIAL ROTARY PISTON ENGINE WITH TROCHOIDAL PISTON RUNNER
Filed Aug. 25, 1966  7 Sheets-Sheet 2

INVENTOR
FRANZ. HUF
BY James E. Bryan
ATTORNEY

Nov. 12, 1968 F. HUF 3,410,254
INNER-AXIAL ROTARY PISTON ENGINE WITH TROCHOIDAL PISTON RUNNER
Filed Aug. 25, 1966 7 Sheets-Sheet 3

FRANZ HUF
INVENTOR

BY James E. Bryan
ATTORNEY

FIG.6 b

United States Patent Office
3,410,254
Patented Nov. 12, 1968

3,410,254
INNER-AXIAL ROTARY PISTON ENGINE WITH TROCHOIDAL PISTON RUNNER
Franz Huf, Constance (Bodensee), Germany, assignor to Dornier System G.m.b.H., a German corporation of limited-liability
Filed Aug. 25, 1966, Ser. No. 575,171
Claims priority, application Germany, Aug. 28, 1965, H 57,011
23 Claims. (Cl. 123—8)

ABSTRACT OF THE DISCLOSURE

A rotary piston engine includes a rotatable piston runner having the configuration of an inflection-point-free cardioid which is rotatably mounted within a stationary housing means, the runner being axially parallel and eccentrically mounted within the housing. The inner surface of the housing corresponds to the outer enclosing curve of the piston runner. Gas inlet means and gas outlet means are formed in the side walls of the housing and are opened and closed by the piston runner. The edges of the inlet means and outlet means disposed remotely from the center of rotation are defined by trochoidal arcs which are coordinated with the positions of the piston runner at the desired time of the beginning of the opening operation and the end of the closing operation; and the inner edge of the outlet means nearest the center of rotation corresponds to the configuration of the inner envelope of the piston runner. In a first form of the invention, one working chamber formed between the runner and the housing is employed for combustion, and a second working chamber is employed as a scavenge pump. In a second form of the invention, a double acting engine has a symmetrical construction with two working chambers formed by two outer envelopes, the chambers being offset about 180° with respect to one another.

---

This invention relates to an inner-axial rotary piston engine, and more specifically, to a rotary piston internal-combustion engine. As is well known, such engines consist principally of a housing or enclosing body and a piston runner which is mounted therein. The axes of the enclosing body and of the piston runner are positioned parallel to but at a distance from each other. All genuine inner-axial rotary piston engines begin with a trochoid, in the design basis thereof, and additionally require the coordinated outer or inner envelope or enclosing curve. The known rotary piston internal-combustion engines all operate according to the four-stroke principle. The majority of the experiments have been conducted with trochoids as the housing wall and with the coordinated inner envelope as the piston runner. Also generally multi-arched trochoids have been employed as a design basis. However, this results in the disadvantage that the eccentricity, i.e., the crank radius of the engine, becomes progressively smaller with each additional arch. For this reason, prior constructions generally have been restricted to a two-arched epitrochoid as the housing with a triangular inner enclosing curve or envelope as the piston runner.

Such known arrangements exhibit an irregular multiple pendulum movement and excessive vibration thereby resulting in non-uniform wear and tear. Additionally, chatter marks are also produced which are extremely undesirable. A further disadvantage is the fact that the combustion chamber of such prior art structures is unfavorably fissured.

While the known construction of rotary piston engines of the other group, i.e., engines of this type having an outer enclosing curve or envelope as housing and a trochoidal piston runner, does not involve the aforementioned difficulties, the disadvantage referred to above with respect to the combustion chamber as well as a gas change problem exist in the case also, since four-stroke engines with multi-arched trochoids are involved here. These engines all have a small eccentricity and crank radius.

This invention provides a rotary piston internal-combustion engine which does not have the disadvantages mentioned above with respect to the combustion chamber and gas change, and which has a favorable output, i.e., efficiency, which also allows for a high compression and which possesses a sufficiently large crank radius at an active angle being as wide as possible. It is particularly advantageous to employ an inflection-point-free trochoid, for example, a trochoid with a flat point, because in these curves, the pendulum movement of the head sealing ledges relative to the rolling or bearing surface is uniform and, furthermore, also the variations of the circumferential speed, i.e., of the gliding velocity of the head sealing ledge on the piston runner, is low. This results in a specifically low stress and in a uniform wear and tear of the head sealing ledge. Moreover, there results the possibility of employing a closed side sealing ledge, at the piston runner, which may be easily fabricated.

While piston runners having a heart-shaped curve are already known per se, they involve a pump wherein the aforementioned problems with respect to combustion chamber and gas change do not arise at all, and wherein, moreover, a particularly well fitting envelope for the trochoid is not necessary. The advantage of the invention is that, due to the choice of the heart-shaped curve or cardioid as the basis for the design of the engine, the largest possible crank radius is attained while the structural size remains the same, as compared to all other trochoids, and this is also true if a somewhat smaller eccentricity is chosen in order to obtain thereby an inflection-point-free curve. The cardioid also provides the largest working space, relatively speaking, and the heart-curve-shaped piston runner will come to rest quite closely against the enclosing curve in the top dead center position, while there is merely the structurally required distance of the equidistants. The entire gas charge is therefore compressed into the combustion chamber proper, i.e., into the cavity in the end face of the housing, producing there a very high compression which makes possible a diesel operation without difficulties. By virtue of the construction as a two-stroke engine wherein the side slots for the gas change are so favorably placed that a desirable asymmetrical gas control is possible with virtually arbitrary control times for the gas change, one also obtains a large active angle per revolution of the eccentric shaft. The combustion chamber itself is not fissured and clefted as in the heretofore known rotary piston internal-combustion engines, and may be provided in the shape most favorable for the combustion process so that a flawless combustion is readily achieved. Due to the specific arrangement and provision of the control slots for the gas change, a good scavenging is attained without gas residue, and even supercharging is possible.

The principle of the invention may be further developed in a manner such that the two arc-shaped working chambers between the envelope and piston runner are employed as combustion chambers, i.e., accordingly, so that a double-acting two-stroke engine is produced having a symmetrical construction. This engine has the method of operation of a double-piston engine. The two working spaces being positioned opposite one another about 180° are therein supplied either by a proper separate scavenge pump, or also by a common scavenge pump, depending upon the requirements. Another embodiment of the invention again employs one of the working chambers as a combustion chamber, while the other working space acts as a scavenge pump for this first working space and provides therefor transfer channels between the two working spaces. The transfer channels are controlled in the same manner by the piston runner and render possible a corresponding gas change in the manner described above. In this case, the engine is a single-acting two-stroke engine. This type of construction affords the advantage that the scavenge pump space displays a greater effective volume than the combustion chamber as a result of the favorable arrangement of the inlet slot and of the transfer channels or ports, and that a supercharge of the combustion chamber is equally possible in this case for that reason. In both embodiments of the invention it is possible to form the cavities in the end housing wall, i.e., the combustion chambers proper, in accordance with the desired combustion process, for example, in a manner such that the inflowing fresh gas or air is whirled about in the chamber and the piston runner will further enhance the vortex formation within the combustion chamber during compression as a result of its rotating surface so that, by means of a tangential or inclined fuel injection to this gas whirl, a uniform combustion can be effected.

The invention will be further illustrated by reference to the accompanying drawings in which.

Figure 1:
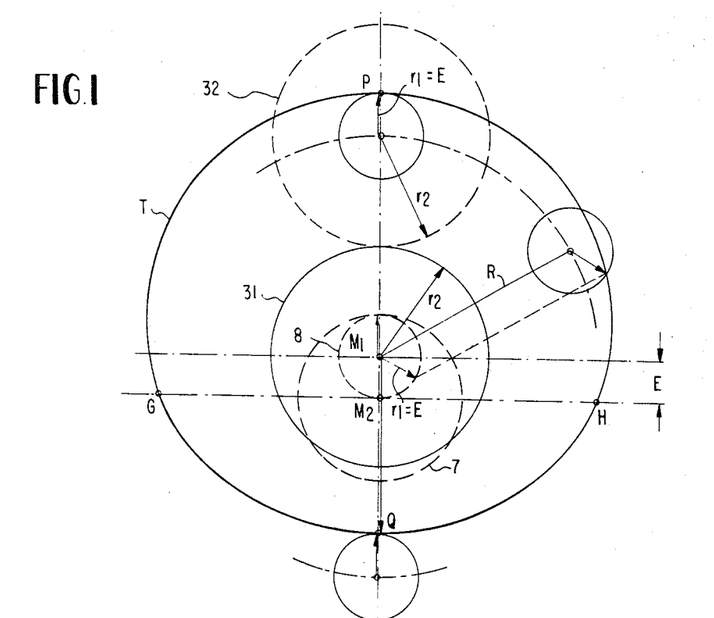
FIGURE 1 illustrates double the production of the trochoids.
Figure 2:
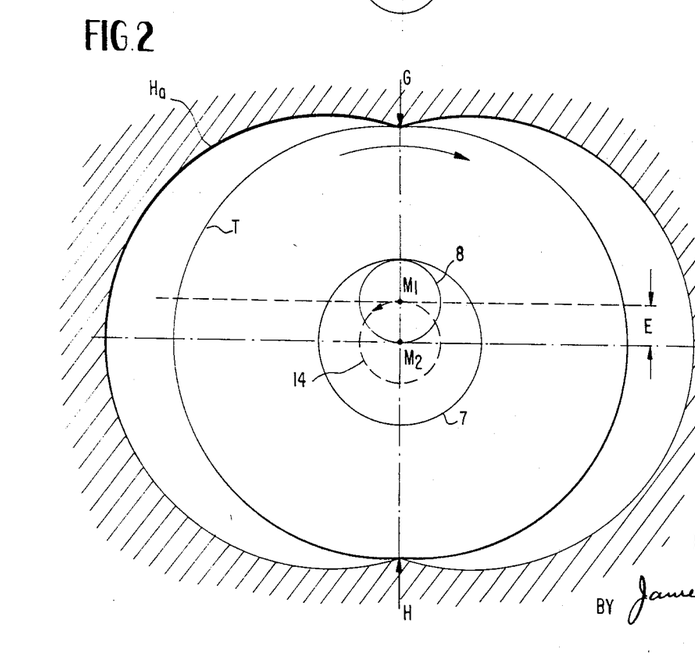
FIGURE 2 illustrates a cardioid as trochoid with outer enclosing curve, i.e., the envelope.
Figure 3:
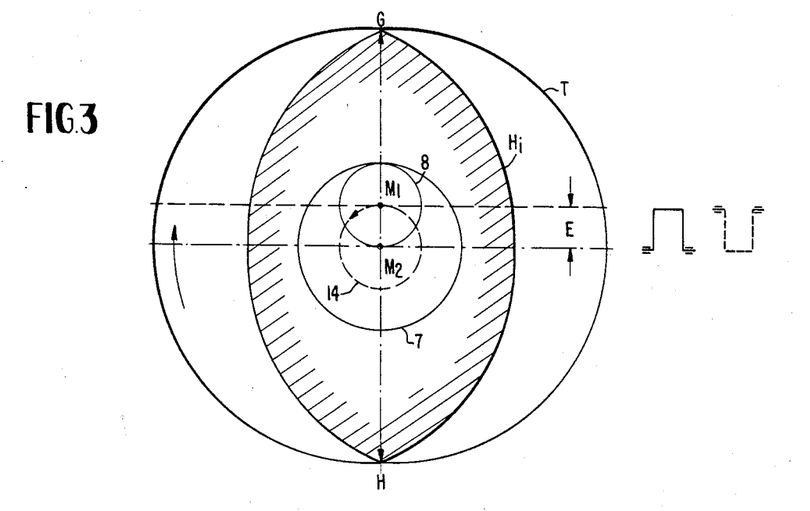
FIGURE 3 illustrates a cardioid as trochoid with inner enclosing curve, i.e., the inner envelope.
Figure 4A:
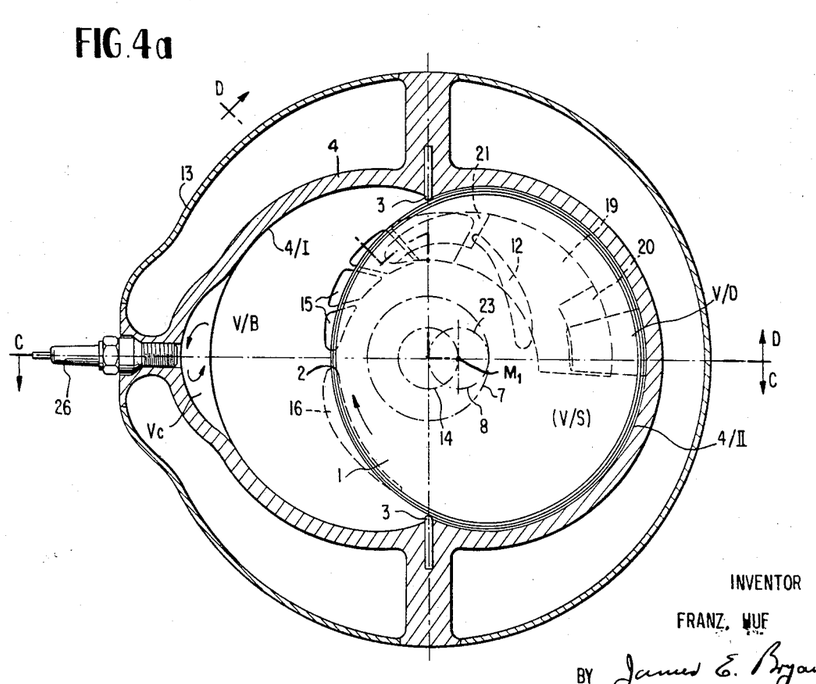
FIGURE 4a is a simplified longitudinal cross-sectional view through a single-acting rotary piston internal-combustion engine.
Figure 4B:
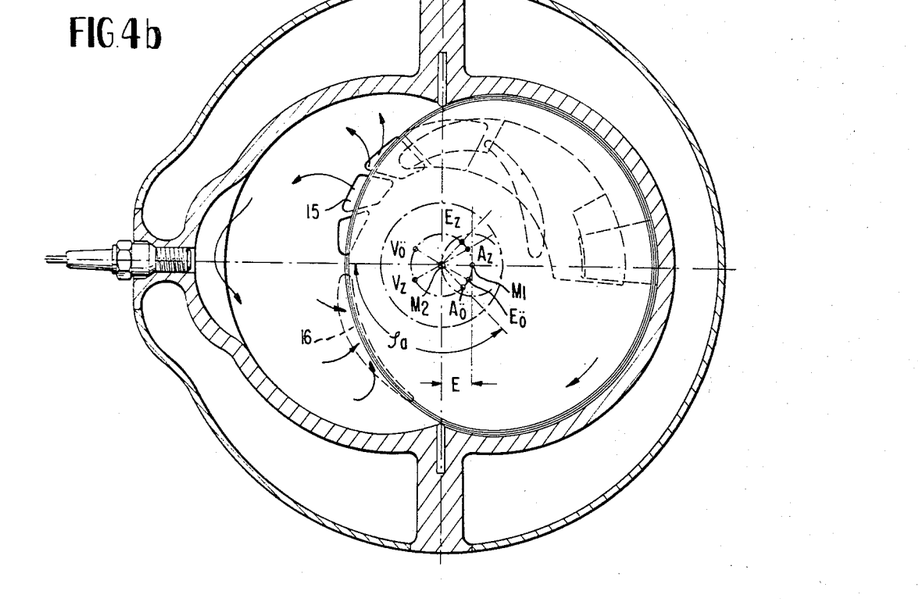
FIGURE 4b illustrates an arrangement according to FIGURE 4a with the gas change.
Figure 4C:
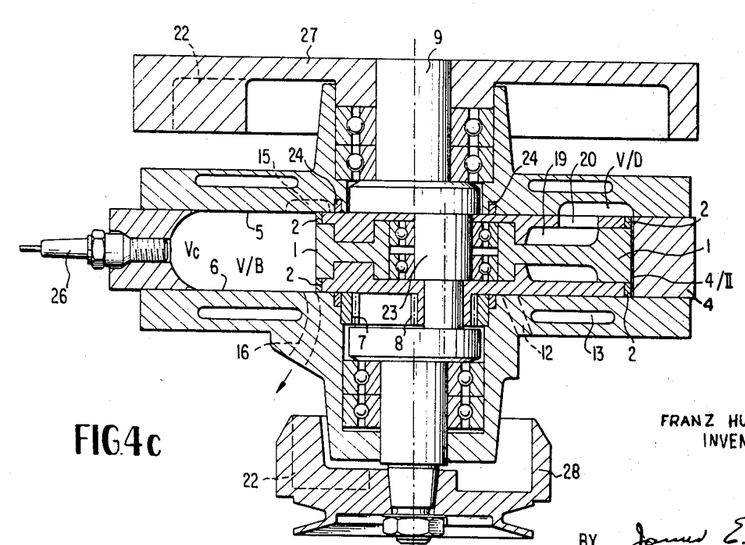
FIGURE 4c is a cross-sectional view through FIGURE 4a, taken along line C—C.

FIGURE 4a shows an embodiment of the invention as a single-acting slot-controlled two-stroke internal-combustion engine having a symmetrical construction. FIGURE 4c shows a view thereof taken along the line C—C in FIGURE 4a. The illustration is greatly simplified in order to emphasize only those elements of the engine which are significant for understanding the invention. This two-stroke internal-combustion engine is provided in this case as an Otto engine, and FIGURE 4a shows the combustion chamber V/B being mounted to the left and the working chamber or space positioned to the right being provided as the scavenge pump V/S. The trochoidal runner has the shape of an inflection-point-free epitrochoid 1:1, i.e., of a cardioid. The piston runner is identified with reference numeral 1 and has the direction of rotation indicated by an arrow therein. Positioned along the edge of the piston runner and at an equidistant distance in an annular closed side sealing ledge 2 which effects the sealing with respect to the two side walls 5 and 6 of the engine housing, FIGURE 4c. It additionally should be noted that in this embodiment, that inflection-point-free trochoid is employed which renders possible the greatest eccentricity E, i.e., the largest crank radius, namely a trochoid with flat point.

Accommodated in the housing at the simultaneous points are the head sealing ledges 3 which separate from each other the two working chambers of the engine, i.e., the combustion chamber V/B and the scavenge pump chamber V/S. The housing wall is formed to the trochoid by the two outer enclosing curve arcs 4/I and 4/II. The two enclosing curve arcs, together with the piston runner, constitute two working chambers. Additionally arranged in the left-hand working chamber, i.e., within the combustion chamber V/B, and in the housing wall, i.e., in the enclosing curve arc 4/I, is a cavity which constitutes the compression chamber $V_c$. Furthermore, the spark plug 26 is mounted in this compression chamber. To effect the gas change, fresh gas is supplied from the carburetor through a scavenge pump inlet channel 12 in the side wall 6 into the scavenge pump chamber V/S. During the rotary movement of the piston runner 1, this fresh gas is compressed in a scavenge pump compression chamber V/D in the side wall and thereafter passes through transfer channels to the scavenge or inlet slots 15 in the side wall 5 of the combustion chamber V/B. The gas outlet slot 16 is positioned in the combustion chamber at the opposite side 6 of the housing wall. The mechanism of operation during the gas change is illustrated in detail and more distinctly in FIGURES 4d and 4e. FIGURE 4b illustrates the mechanism of operation during the gas change in dependence upon the respective angular position of the piston runner. FIGURES 4a and 4b illustrate the piston runner 1 in the UT or lower dead center position with regard to the combustion chamber V/B.

Figure 4D:
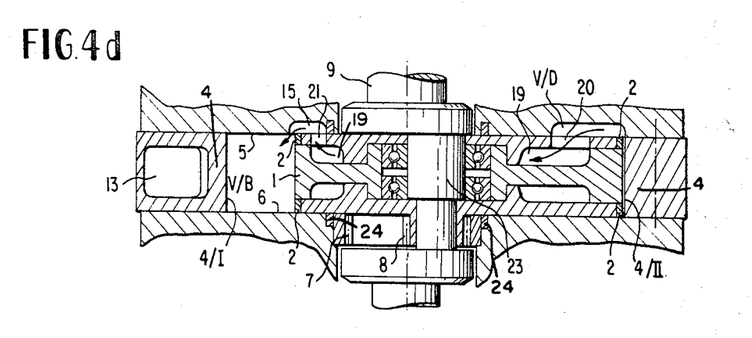
FIGURE 4d is a simplified cross-sectional view through FIGURE 4a, taken along line D—D, with the gas change.

In the arrangement of the scavenge and exhaust slots 15 and 16, respectively, as illustrated herein, there results a genuine differential control of the gas change. After the burning of the mixture in the compression chamber $V_c$, the piston runner 1 moves from the top dead center position thereof, not shown, in the direction of the arrow according to FIGURES 4a and 4b, respectively, over the active angle $\varphi a$. The crankshaft pin 23 rotates at that time in the opposite direction and the center $M_1$ thereof describes the crank circle in the direction shown in FIGURE 4b. After the rotation of the piston runner 1 about the angle $\varphi a$, the edge of the piston runner 1 opens first the outlet or exhaust slots 16 in dependence upon the direction of rotation and at the angular postion $A\ddot{o}$ of the center $M_1$ of the eccentric pin 23. This results in a practically complete lowering of the combustion gas pressure until, after a further rotation of, for example, 15°, the piston runner edge will open the scavenge slots 15 at the position $E\ddot{o}$ of the eccentric pin center $M_1$, and the pre-stored fresh gases which are drawn in, in the right working chamber i.e. in the scavenge pump chamber V/S, through the scavenge pump inlet channel 12 and which are precompressed in the scavenge pump, flow from the compression chamber V/D through the piston window 20, through the transfer channel 19 and a second piston window 21, and through the scavenge slots 15. This flow is illustrated by arrows in FIGURE 4d. FIGURE 4d corresponds to the section line D—D in FIGURE 4a.

The scavenging operation will now be described once more with reference to FIGURE 4e. The fresh gases enter the combustion chamber through the scavenge slot 15. Due to the fact that the scavenge slot 15 and the exhaust gas slot 16 are not positioned directly opposite one another on the two side walls 5 and 6, respectively, but instead are positioned in succession with respect to each other in the direction of rotation of the piston runner, a perfect uniflow scavenging is effected, as shown by the arrow. The gases thereby traverse a spatial path or course since, as mentioned above, the scavenge slot 15 and the exhaust slot 16 are not positioned within the plane of the drawing, but is must be imagined that one is positioned to the front and the other to the rear thereof. During this spatial spiral movement of the fresh gases, the flow through the compression chamber $V_c$ is very good so that the residues of burned gases therein are eliminated therefrom and a perfect new charge is obtained. The gas change effected in the manner thus described has characteristics both of uniflow scavenging and also of reverse scavenging so that it will be hereinafter referred to as uniflow-reverse scavenging or uniflow-spiral scavenging. The configuration of the compression chamber $V_c$, in this case a spherical cavity in the wall 4/I of the enclosing body, i.e. in the enclosing curve wall, enhances the vorticity and the scavenging effect. In FIGURE 4a, this vorticity again has been shown by arrows in the compression chamber $V_c$. When the piston runner 1 rotates, the gas flow having been initiated by the scavenging operation is continued along the wall of the compression chamber $V_c$ and, after the closure of the outlet and the scavenge slots, the piston runner provides a closed vortex flow of the gas due to surface friction, and at that time the diameter of the vortex will be progressively reduced and compressed with a continuing rotation of the piston runner and finally will be limited to the compression chamber $V_c$. The direction of rotation of the gas vortex as shown still has the direction, at the wall of the compression chamber $V_c$, FIGURE 4a, which has been initiated by the scavenging operation. On the other side, i.e. on the piston runner, the vorticity is synchronous with the rotating piston runner surface. Accordingly, the piston runner furthers, in the direction of movement thereof, the vorticity of the compressed gases in the compression chamber $V_c$ as a result of surface friction. The combustion process therefore is considerably improved.

Figure 4E:
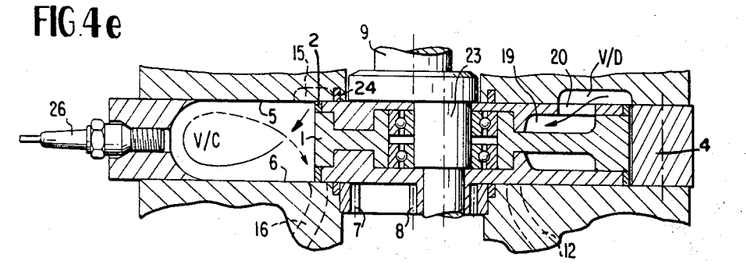
FIGURE 4e is a simplified cross-sectional view through FIGURE 4a, taken along line C—C with the gas change.

In the angular position $Az$ of the center $M_1$ of the eccentric shaft pin 23, the piston edge closes the outlet slot 16 which is provided in the side wall 6 according to FIGURES 4c and 4e. The exhaust gases flow through the slot 16 and the connected exhaust pipe into the atmosphere. When, during the further rotation of the eccentric shaft pin 23, the center $M_1$ thereof is positioned in the angular position $Vö$, according to FIGURE 4b, the edge of the piston runner 1 opens the scavenge pump inlet slot 12 in the side wall 5 of the housing. From the carburetor, not shown, fresh gas then can flow into the right working chamber, or into the scavenge pump chamber V/S. In the desired angular position $Vz$, the scavenge pump inlet slot 12 will again be closing.

The transfer flow mechanism between the scavenge pump working chamber V/S and the combustion chamber V/B will now be considered once again. As has been described above, the fresh gas being drawn in from the carburetor is compressed in the scavenge pump chamber V/S and finally compressed in the scavenge pump compression chamber V/D which is mounted in one side wall of the housing. The connection to the combustion chamber V/B is effected in a manner such that the scavenge slots 15 are opened first by means of the piston runner edge in the combustion chamber V/B. Thereupon the piston window or aperture 20 is aligned in front of the scavenge pump compression chamber V/D so that the compressed fresh gases can enter through the piston window 20 into the hollow piston conduit 19 serving as transfer conduit. The transfer channel terminates at the other end thereof into another piston window 21 and establishes there the connection to the inlet slots 15 in the combustion chamber. It is also possible, of course, to provide the piston runner with a different configuration and to provide, instead of the hollow conduit 19, only a recess in the side wall of the piston runner which acts as a transfer channel. In that case, the two piston windows 20 and 21 are unnecessary. The position and construction of the side transfer channel may be similar to the position of the hollow piston 19 which is apparent from FIGURE 4a. Also possible is a construction in which recesses are provided as transfer channels on both side flanks of the piston runner. Finally, it should be noted that the transfer channels or conduits also may be positioned in the side walls 5 or 6 of the housing, and these transfer channels are again controlled by the piston runner.

Additionally apparent from the embodiment of FIGURE 4a are the provision and size of the scavenge pump compression chamber V/D and of the piston window 20. The connection to the hollow piston conduit 19 is accomplished by means of the piston window 20 shortly before the top dead center position of the piston runner in the scavenge pump working chamber V/S is attained. This connection remains open only for a specific short period of time so that a transfer flow of the pre-stored fresh gases to the combustion chamber V/B is possible only during this time. These fresh gases may flow out into the combustion chamber through the open inlet slots 15, at which time, due to the preliminary compression, a supercharge of the combustion chamber is readily possible as a result of the differential control, while it is impossible for backflow or backfiring to occur through the open inlet slots when the piston runner, during rotation thereof, initiates the compression process. One has a choice with respect to the period of time of closing the connection between the scavenge pump compressions chamber V/D and the piston window 20. The closing time is chosen about so many radians after the top dead center position that the connection between the scavenge pump compression chamber V/D and the hollow piston conduit 19 is maintained for approximately the same period of time as the scavenge slots 15 in the combustion chamber V/B are open. During the further rotation of the piston runner starting from the top dead center position, as shown, in the scavenge pump chamber V/S, a negative pressure is produced there for the suction of the fresh gases from the carburetor, as a result of this construction. Since, however, the edge of the piston window 20 will again disconnect in due time the scavenge pump compression chamber V/D from the transfer conduit 19, a negative pressure within the conduit 19, or even within the combustion chamber V/B can not have any adverse effects.

The heart curve-shaped cardioid side seals 2 seal the piston runner 1 off against the side walls 5 and 6 in a closed sealing border. Additional oil packings 24 which are circular in shape and, if desired, are supported in their function by means of a spring, separate the eccentric shaft chamber against the combustion chamber and the side walls 5 and 6.

In order to be able to completely balance out this rotary piston engine statically and dynamically with mechanical accuracy, it is necessary to initially balance out the heart curve-shaped piston runner 1 itself statically and dynamically about the center of rotation $M_1$ thereof. This is accomplished, for example, according to FIGURE 4c, by means of hollow cavities 19 within the piston, these hollow cavities being utilizable, if desired, as transfer channels for the gas change. When the piston runner 1 rotates on the eccentric shaft pin 23, it is necessary to mount a static and dynamic equalization by means of corresponding counterweights on the eccentric shaft. In FIGURE 4c is shown the counterweight 22 on the flywheel 27 and the counterweight 22 is also mounted at the forward gear and V-belt pulley 28. Both counterweights are, of course, structurally so mounted in the total effect thereof that they represent an exact static and dynamic compensation or equalization with respect to the eccentric mass of the piston runner 1.

The necessary planetary-like secondary movement of the piston runner 1 is forcibly effected by means of the externally-toothed gear 8 which is rigidly connected to the piston runner 1 and rolls off the internally-toothed gear ring 7 during rotation of the eccentric shaft pin 23.

The combustion chamber V/B and the scavenge pump chamber V/S are enclosed within a cooling water jacket 13. The eccentric shaft 9 is mounted in bearings within the housing, which simultaneously constitutes the side walls 5 and 6. The flywheel 27 and the V-belt pulley 28 are mounted on the eccentric shaft 9 in a manner such that the balancing conditions are met. The side wall 5 also contains the scavenge or inlet slots 15 and the scavenge pump compression chamber V/D. The center part of the internal-combustion engine representing the delimiting wall 4 corresponds, in the inner delimiting surface thereof to an external envelope, to the chosen epitrochoid 1:1, i.e. to the cardioid. The head sealing ledges 3 are mounted in the simultaneous points. They extend over the entire piston width from the side wall 5 to the side wall 6 and form together with the side sealing ledges 2, being adapted to the heart curve shape, on both sides of the piston runner 1 a closed sealing border for the working chambers V/B and V/S.

The front side wall 6 contains the outlet slot 16 with the exhaust gas pipe connected thereto, and symmetrically thereto the scavenge pump inlet slot 12 with the carburetor pipe connected thereto. Connected with the side wall 6 in a manner rigid against torsion is the internally-toothed gear 7 with the partial circle radius 2E thereof. The partial circle radius $r_1$ of the externally-toothed gear 8 which is rigidly connected with the piston runner 1 corresponds to the eccentriity E. Indicated additionally in the side parts with the walls 5 and 6 are the cooling water channels 13. The volume of the combustion chamber is calculated as $$V_a = V/B = V/S = 8 \cdot E \cdot R \cdot B$$

wherein E is the eccentricity of the chosen epitrochoid 1:1, R is the sum of the radii of the base circle and the rolling circle of the epitrochoid, and B is the width of the working chamber between the side walls. If the parameters are indicated in decimeters, one obtains the volume $V_a$ in cubic decimeters and, also, the liter indication. The performance formula in this case is $$N_e = \frac{V_a \cdot p_e \cdot n}{450} (Hp)$$

wherein $n$ is the number of revolutions of the eccentric shaft per minute and $p_e$ the mean combustion pressure in kp./cm.$^2$.

In this embodiment as a single-acting rotary piston interal-combustion engine, an excellent gas change is obtained. The outlet slots 16 will open first and the pressure of the combustion bases is lowered to such an extent that a flawless scavenging of the combustion chamber can take place during the subsequent opening of the inlet or scavenge slots 15. Inlet and outlet slots are open during the scavenging process. Thereafter, the outlet slot 16 will close first and then the inlet slot 15 when both slots are covered by the piston runner edge. Accordingly, a desired asymmetrical gas control is achieved. Added thereto is the differential control, with the differential angle β between the closure of the outlet and of the inlet slots. This angle is advantageously of the order of approximately 15° and makes possible a supercharge of the combustion chamber V/B. The opening and closing times may be selected depending upon the requirements of the asymmetrical control. The external delimiting lines, i.e. the delimiting lines or edges of the inlet and outlet slots facing away from the center of rotation are determined by at least two trochoidal arcs, namely the position of the trochoid at the beginning, and the position of the trochoid at the end of the outlet process and, correspondingly, also of the inlet process or operation. The scavenging effect and the tendency to vortex formation is improved if at least the inlet slots terminate obliquely into the combustion chamber V/B and have at that time a direction approximately toward the cavity of the compression chamber $V_c$.

A further advantageous feature resides in that the scavenge pump inlet channel 12 consists of a narrow elongated slot which equally may be formed of two trochoidal arcs, which is narrower than the inlet and outlet slots in the combustion chamber. Consequently, the initial volume for the compression process within the scavenge pump chamber V/S is greater than the initial volume within the combustion chamber V/B when the side slots are closed at the beginning of the compression operation. It is therefore possible to preliminarily compress a sufficient amount of fresh gas, for the scavenging and supercharge process, in the scavenge pump compression chamber V/D. The internal delimiting lines or edges of the scavenge pump inlet slot 12 and also of the outlet slots 16 equally may be formed by a trochoidal arc, and specifically by the trochoidal arc in the bottom dead center position of the piston runner, or in other words, by means of the internal envelope. Such a delimitation toward the center of rotation is not possible in this case with the scavenge slots 15 because they must bridge the distance between the piston window 21 and the piston runner edge in the respective position. By virtue of this slot configuration, one has the possibility to select the times for opening and closing the slots entirely in dependence on the requirements. Furthermore, this provision or construction of the slots results in a temporally favorable opening course of the outlet slots 16 so that the tendency of the eccentric shaft to perform inherent vibrations is small. It should be noted finally that the construction of the engine as a single-acting internal-combustion engine, as described herein, is equally suitable for drawing in fresh gas or pure air so that, in addition to the example of an Otto engine as illustrated, the rotary piston internal-combustion engine may be modified for diesel operation since, as has been described above, the entire charge for the combustion chamber is compressed into the small compression chamber $V_c$ so that the high compression required for the Diesel operation is attained there.

Figure 5:
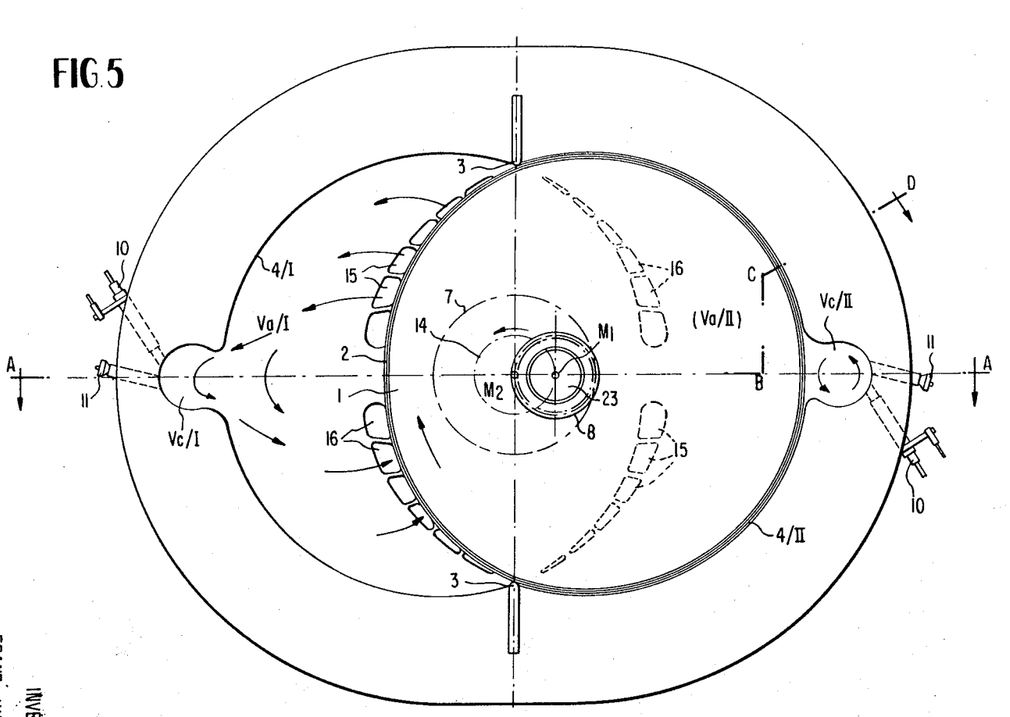
FIGURE 5 is a simplified longitudinal cross-sectional view through a double-acting rotary piston internal-combustion engine.
Figure 7:
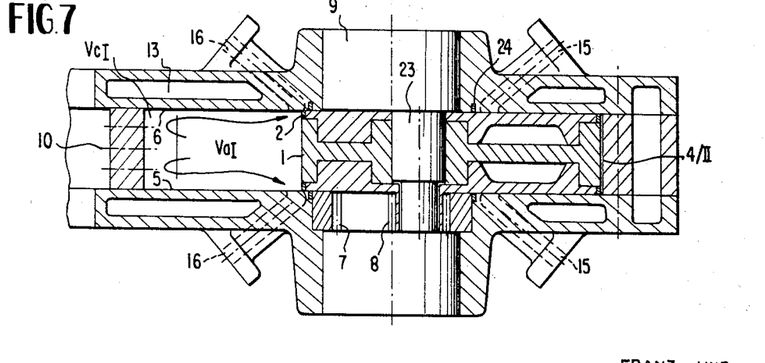
FIGURE 7 is a cross-sectional view taken on line A—A of FIGURE 5.

FIGURES 5 and 7 show another embodiment of the invention, namely a double-acting slot-controlled uniflow two-stroke internal-combustion engine. In this case, the rotary piston internal-combustion engine has been illustrated as a diesel variant and, according to FIGURE 5, the working chamber to the left is designated as $V_{a/I}$, and the working chamber to the right as $V_{a/II}$. Both working chambers are, of course, completely identical since this engine also utilizes a heart curve-shaped piston runner with the respectively coordinated two-arc external enclosing curve as an envelope or a parallel curve to this envelope. A cardioid with flat point or a parallel curve to this cardioid also has been chosen in this embodiment. This internal-combustion engine necessitates a separate scavenge pump, for example, an exhaust gas-driven gas turbine with directly-coupled radial scavenge pump, as is conventional in large diesel engines or exhaust gas-charged internal-combustion engines.

This modified embodiment is constructed as follows: The piston runner 1 with the conventional side sealing ledges 2 and the simultaneous point head sealing ledges 3 increases and decreases the working chambers $V_{a/I}$ and $V_{a/II}$ sinusoidally. Due to the planetary-like secondary rotary movement of the piston runner 1, the combustion air is whirled about within the combustion chamber $V_{a/I}$ and $V_{a/II}$, respectively, in the direction of the arrows, analogously to the embodiment of FIGURE 4 described above. This geometrically strictly controlled air vortex is initiated due to the inflow kinematics of the scavenging air from the inlet slots 15, which are disposed in this case, according to FIGURE 7, both in the side wall 5 and in the side wall 6, and if desired, the inlet slots may terminate into the side walls at an angle being directed approximately toward the compression chamber $V_{c/I}$ and $V_{c/II}$, respectively. The vortex flow then is completed by virtue of the rotary movement of the piston runner. When the piston runner 1 has attained the top dead center position shown in FIGURE 5 within the working chamber $V_{a/II}$ to the right, the entire combustion air is compressed into the compression chamber $V_{c/II}$ and forms there, in this desirably cylindrically-shaped compression chamber, a rotary whirling movement in the direction of the arrows. Fuel is injected by means of the fuel injection nozzle 10 tangentially to this rapidly-rotating cylindrical air mass and is deposited partly on the hot cylindrical compression chamber wall where it is evaporated and burned gently and completely by the rotating air column. Depending upon the width of the engine and of the piston runner, it is also possible to provide several fuel injection nozzles in the same compression chamber, as shown in FIGURE 7. Also, the glow plugs 11 may be provided in the compression chamber $V_c$.

FIGURE 5 illustrates, together with FIGURE 7, the provision of the inlet slots 15 and of the outlet slots 16. It is apparent that these slots are mounted in pairs in the two side housing walls 5 and 6. Moreover, the inlet slots 15 and outlet slots 16 are positioned symmetrically to the top dead center position of the engine. Here again, the outer delimitation or edges of the slots is formed by two trochoidal arcs, as is evident from FIGURES 6a and 6b. The inner delimiting lines or edges of the slots may be formed in this case by the inner envelope and, respectively, by the edge of the piston runner 1 in the bottom dead center position thereof.

Figure 6A:
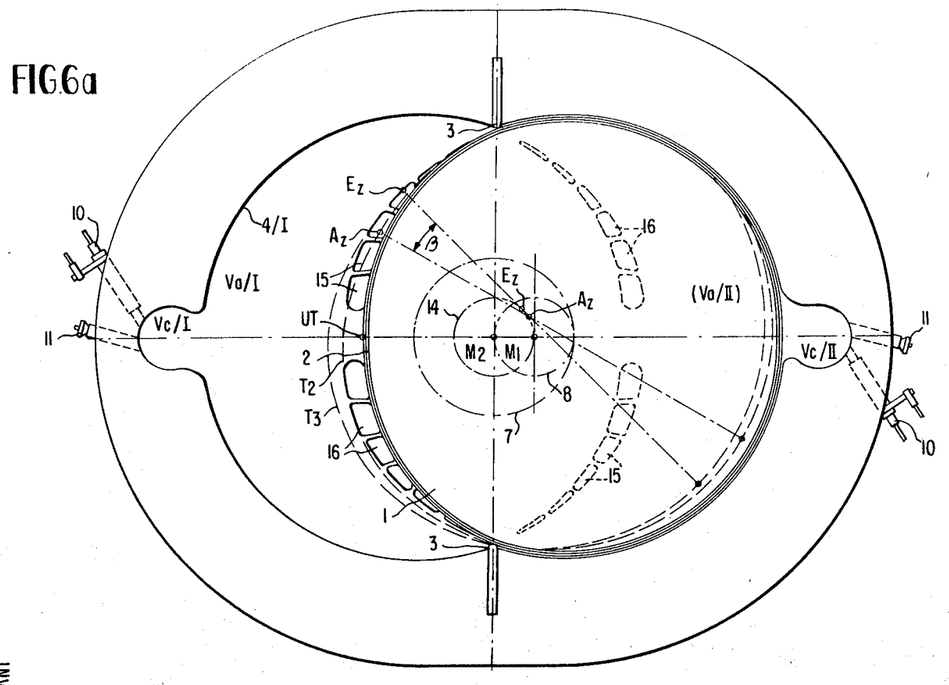
FIGURES 6a and 6b illustrate the provision of the gas inlet and gas outlet channels according to FIGURE 5.
Figure 6B:
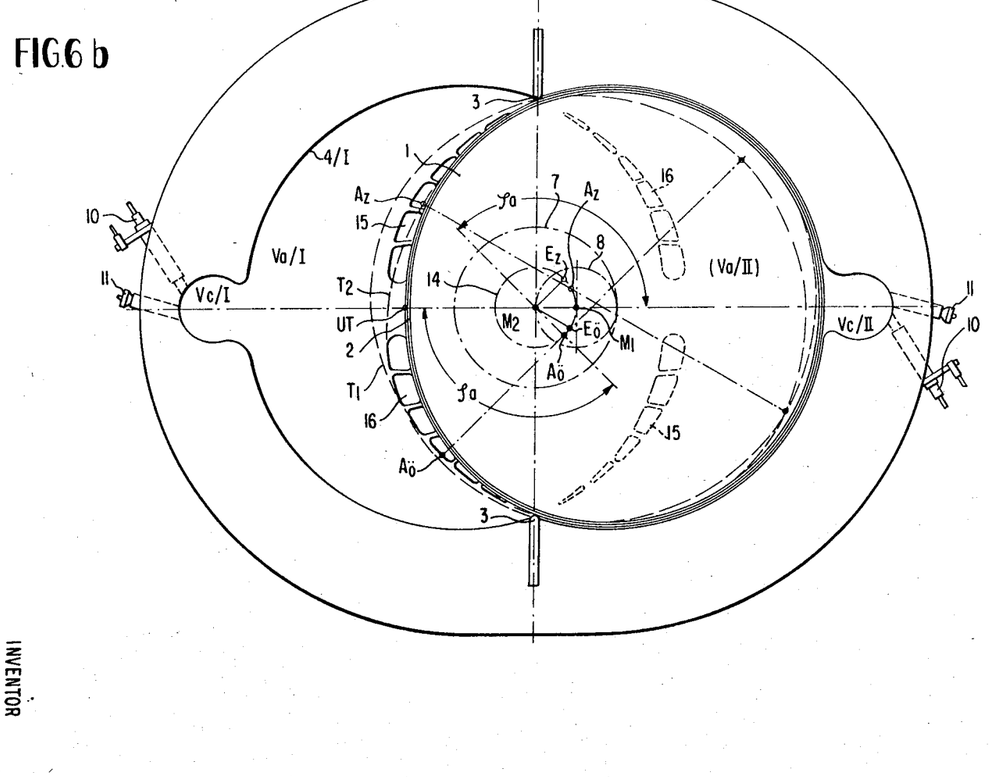

FIGURE 6b shows the piston runner 1 in the bottom dead center position thereof with respect to the working chamber $V_{a/I}$. The piston runner edge forms here the inner delimitation of the inlet and outlet slots 15 and 16, respectively. If the piston runner is assumed to be in a position of, for example, 45° ahead of the bottom dead center position, the eccentric shaft center $M_1$ has the position Aö on the crank circle 14. In a corresponding manner, also the point of the piston edge designated with UT then will be positioned at the point AöUT. The piston runner and the trochoid thereby will assume the position $T_1$ shown in dashed lines. It is evident that in the neighborhood of the point Aö/UT this trochoidal path $T_1$ limits outwardly the outlet slots 16 and, during further rotation of the piston runner toward the bottom dead center position, opens the outlet slots 16. With the further rotation of the piston runner 1 beyond the UT-position, i.e. the bottom dead center, the piston runner assumes the trochoidal position $T_2$, which also has been shown in dashed lines. The eccentric shaft pin center $M_1$ then is in the position Az, for example 30° after UT. It is apparent that in this trochoidal arc $T_2$, the other part of the outlet slots 16 is just being closed again. Accordingly, due to the selection of the trochoidal position, one has the possibility of selecting the time period for the beginning of the opening and the end of the closing operations of the outlet slots 16 depending upon the desired asymmetrical control. Analogous considerations also apply to the outer delimitation of the inlet slots 15 which are formed by the two trochoidal arcs at the beginning of the opening operation and at the end of the closing operation. These trochoids have not been shown herein for the sake of greater clarity of the drawings, but if they were illustrated, they would be positioned with respect to the position of the eccentric shaft center $M_1$ at Fö 30° ahead of UT and at Ez 45° behind UT. Here again, the control times may be selected in dependence upon the requirements. FIGURE 6b also shows the active angle $\varphi a$ which is here 135°.

FIGURE 6a illustrates the two trochoidal arces $T_2$ at the end of the closing operation of the outlet slots 16 and $T_3$ at the end of the closing operation of the inlet slots 15. Accordingly, the eccentric shaft center $M_1$ would be in the position Az at 30° after UT and Ez at 45° after UT. The differential angle $\beta$, which is here 15°, for example, renders possible the differential control and the supercharge of the working chamber.

The gas change is here again as ideal as in the above-described modified embodiment as a single-acting two-stroke engine. If, according to FIGURE 6b, the center $M_1$ of the eccentric shaft pin 23 is in the angular position Aö, for example 45° ahead of the UT-position with respect to the working chamber $V_{a/I}$, the outlet slots 16 will open. The pressure of the combustion gases drops at that time so rapidly that, during the subsequent opening of the scavenge slots or inlet slots 15, a thorough scavenging of the combustion chamber can take place. Thereafter, the inlet or scavenge slots 15 will open in the angular position Eö 30° ahead of UT. Thereupon the scavenging operation begins and lasts until the outlet slots 16 are again closed at Az 30° after UT. Since the inlet slots 15 remain open to Ez at 45° after UT, it is possible to supercharge during that time. One can, therefore, expect in the combustion chamber an initial pressure above atmospheric pressure. Ideal gas change times and ideal vortex movements of the combustion air will be produced; the scavenge operation furthers the vortex movement within the combustion chamber and the piston runner completes the same by means of surface friction. As a consequence thereof, ideal and geometrically accurately controlled vortex movements will result also in the two compression chambers $V_{c/I}$ and $V_{c/II}$ and, accordingly, excellent combustion processes.

FIGURE 7 is a cross-sectional view through this engine, taken along line A—A in FIGURE 5. The simple gear arrangement is visible therein, i.e. the externally-toothed gear 8 is rigidly connected with the piston runner 1 and, during rotation of the eccentric shaft 9, rolls off in the internally-toothed gear ring 7 which is rigidly connected with the side wall 5. The side sealing ledges 2 on both sides of the heart curve-shaped piston runner 1 and the head sealing ledges 3 constitute closed sealing borders for the two working chambers $V_{a/I}$ and $V_{a/II}$.

In a manner similar to two-stroke opposed twin engines, there will result two active angle zones $\varphi a$ which are positioned symmetrically opposite one another, in this case 135° each, as is apparent from FIGURE 6b. These two active angle zones together result in twice as large an active angle as in the single-acting engine described above. This means that, during one full revolution of the eccentric shaft over the angle of 270°, the heart curve-shaped piston runner is actively further moved by the pressure of the combustion gases, two duty cycles of the two-stroke rotary piston internal-combustion engine taking place per revolution of the eccentric shaft.

It is emphasized that in this symmetrical double rotary piston engine, both side delimiting surfaces 5 and 6 may be provided with inlet and outlet slots 15 and 16, respectively, so that, as described above, the scavenging air and the fresh gas mixture is so distributed in the combustion chamber $V_{a/I}$ and $V_{a/II}$, by means of correspondingly obliquely-directed inlet slots, that the so-called gas residue is practically zero after each cycle. The gas circulations produced during the scavenging operation in the combustion chamber $V_{a/I}$ and in the compression chamber $V_{c/I}$, which is cylindrical in this case, are indicated with arrows in FIGURE 5. The influence of the arrangement in pairs of the inlet and outlet slots 15 and 16, respectively, in the two side walls 5 and 6 are visible from the arrows in FIGURE 7. A spatial gas flow is produced since, in FIGURE 7, the inlet slots 15 in the combustion chamber $V_{a/I}$ are to be imagined as positioned above the plane of the drawing, and the outlet slots 16 are positioned below the plane of the drawing, as indicated in dashed lines. By reason of the turbulence of the air flowing in obliquely from both sides, the formation of a cylindrical vortex is initiated in the compression chamber $V_c$ and the scavenging is continued, in the direction of the arrows, to the outlet channels 16. The initial flow of the inflowing air which is positioned above the plane of the drawing, originates from the inlet slots and flows or runs together in the center, has not been illustrated in FIGURE 7. The inlet direction in the two side walls may be chosen, if desired, to be of a variable oblique degree so that the two partial flows have a spiral rotary movement which enhances the scavenging and whirling operation.

The driving system described herein executes one cycle per revolution of the eccentric shaft and per working chamber so that the total working chamber per eccentric shaft revolution is $V_A = 2 \cdot V_a$. The formula of the working chamber is $$V_A = 16 \cdot E \cdot R \cdot B [dm^3]$$

wherein E is the eccentricity of the chosen epitrochoid 1:1 (cardioid) in decimeters, R represents the sum of the radii of the fixed and rolling circles of the epitrochoid in decimeters, and B is the width of the working chamber in decimeters. The output is determined according to the general two-stroke output formula $$N_e = \frac{V_a \cdot p_e \cdot n}{450} (Hp)$$

wherein $n$ is the number of revolutions of the eccentric shaft per minute, and $p_e$ is the mean combustion pressure in kp./cm.$^2$. The mean circumferential speed of the piston runner with respect to the head sealing ledges in the simultaneous points is $$c_m = \frac{R \cdot n}{30} \cdot \pi (m/s); R[m]$$

Basically, it is possible to employ engines of the single-acting construction as described above with one piston runner. For specific purposes or applications, however, it is readily possible to arrange two such systems, consisting of a combustion chamber and a scavenge pump chamber, on a common axis in a mirror-image manner. Analogously, it is equally possible to dispose additional piston runners symmetrically on a common axis so that above all the balancing conditions are met. Such an arrangement results in an increase of the active angle $\pi a$, and a uniform torque output as well as a quiet operation are thereby assured. Analogous considerations also apply to the above-described double-acting engine.

To summarize, several essential advantages which are attained with the invention, as compared to engines heretofore known will now be enumerated once again. The invention provides, for the first time, a two-stroke rotary piston internal-combustion engine which may be constructed as a heavy-duty machine because of the high compression attained and which is required for diesel operation and because of which diesel operation in the heretofore known engines has always failed. The engine of the invention has a crank radius which is attainable as an optimum and with which a high torque output is possible even at low speeds. This engine therefore is suitable equally as a low-speed or a high-speed engine. Due to the extremely favorable interaction of the inlet slots and the compression chambers within the enclosing body, an intimate whirling of the compressed medium and a very favorable pattern of the combustion are attained. The combustion velocity in both the Otto engine and in the diesel modification is influenced very considerably and positively so that the highest speeds may be obtained under the most favorable combustion conditions. In this connection, a very low fuel consumption is guaranteed over the entire speed range. The control times may be selected in dependence upon the respective requirements and any desired asymmetrical gas control and differential control may be realized. Due to the particularly favorable configuration of the compression chambers which are accommodated as cavities in the enclosing body and in which the combustion process is initiated, no gas residue which could reduce the efficiency of the engine remains after the scavenging operation. Under certain conditions the piston runners themselves may be sufficiently large as gyrating masses and may be balanced within themselves so that they can bridge the gas pressure-free zones. The construction as a single-acting machine wherein one of the working chambers serves as a combustion chamber and the other as a scavenging pump represents a particularly fortunate solution since in this case not only the torque output but also a preliminary compression of either the scavenging air or of the fresh gas mixture are attained by means of one piston runner to such a high degree as has not been achieved heretofore in rotary piston engines, and by far not to the same extent in reciprocating two-stroke engines.

It will be obvious to those skilled in the art that many modifications may be made within the scope of the present invention without departing from the spirit thereof, and the invention includes all such modifications.

What is claimed is:

1. An inner-axial, two-stroke, two-chamber, rotary piston engine comprising stationary housing means and trochoidal piston runner means axially parallel and eccentrically mounted within said housing means, said piston runner means having the configuration of an inflection-point-free cardioid, the inner cooperating surface of said housing means having a configuration corresponding to the outer enclosing curve of the piston runner means, a pair of chamber means being defined in said housing means, at least one of said chamber means comprising a combustion chamber means, gas inlet means and gas outlet means in the side walls of said housing means and in communication with said combustion chamber means, said inlet means and said outlet means being opened and closed by said piston runner means, the outer edges of said inlet means and outlet means remote from the center of rotation being defined by at least two trochoidal arcs which are coordinated with the position of the piston runner means at the desired time of the beginning of the opening operation and the end of the closing operation of said inlet means and said outlet means, the inner edge nearest the center of rotation of said outlet means conforming to the inner envelope of the piston runner means.

2. An engine according to claim 1 wherein one of said chambers comprises a scavenge pump chamber, and a scavenge pump compression storage space being positioned in a side wall of the housing and in communication with said scavenge pump chamber.

3. An engine according to claim 1 including a compression chamber defining a cavity extending outwardly of said inner cooperating surface of the housing, said compression chamber being in communication with said combustion chamber and having a curved cross-sectional configuration in the direction of rotation of the runner means and also in a direction extending perpendicular to the direction of rotation of the runner means, said last-mentioned curved configuration extending substantially throughout the width of the associated combustion chamber.

4. An engine according to claim 1 in which the piston runner is an inflection-point-free trochoid with flat point.

5. An engine according to claim 1 in which the gas outlet means and gas inlet means are positioned in series in the direction of revolution of the piston runner.

6. An engine according to claim 5 in which the gas outlet means and gas inlet means are positioned in opposite walls of the housing.

7. An engine according to claim 6 in which the gas outlet means and gas inlet means are provided in both chambers symmetrically with respect to the top dead center position of the piston runner.

8. An engine according to claim 7 in which the gas outlet means and gas inlet means are provided in pairs on both side walls of the housing.

9. An engine according to claim 8 in which at least the gas inlet means enter the chambers in an oblique direction pointing approximately toward the compression chamber means.

10. An engine according to claim 9 including fuel injection means in the compression chamber means whereby fuel is injected tangentially into the vortex flow in the direction of rotation of the vortex, the fuel injection means being present in two working chambers.

11. An engine according to claim 10 in which the fuel injection means includes a plurality of fuel injection nozzles.

12. An engine according to claim 1 which is a double-acting engine having a symmetrical construction with two working chambers formed by two outer envelopes, the chambers being offset about 180° with respect to each other.

13. An engine according to claim 12 including common scavenge pump means for both working chambers.

14. An engine according to claim 1 which is a single-acting engine having a symmetrical construction in which one working chamber means formed between one of the outer envelopes and the piston runner is employed for combustion and the other working chamber means formed between the other envelope and the piston runner is employed as a scavenge pump.

15. An engine according to claim 14 in which a gas inlet means is provided in the side of the scavenge pump chamber and gas outlet means in the combustion working chamber means, whereby gas change is effected from the scavenge pump side toward the combustion working chamber side through scavenge means and transfer channel means controlled by the piston runner.

16. An engine according to claim 15 in which the piston runner has channel means therein which connects, within the range of the top dead center position of the piston runner in the scavenge pump working chamber, a scavenge pump compression chamber in the side wall of the scavenge pump chamber with scavenge means opening into the combustion working chamber through a side wall thereof.

17. An engine according to claim 16 in which the channel means is formed by a hollow space in the piston, which space terminates in two apertures in the piston.

18. An engine according to claim 17 in which the channel means is formed such that it connects the scavenge pump and combustion working chamber shortly prior to the top dead center position of the piston runner with the scavenge pump working chamber and disconnects them shortly after the top dead center position.

19. An engine according to claim 16 in which the channel means is formed such that the connection to the scavenge means opening into the combustion working chamber is effected after the connection to the scavenge pump compression chamber.

20. An engine according to claim 16 in which the gas inlet means in the side of the scavenge pump chamber is narrower than the gas outlet means and scavenge means in the combustion working chamber.

21. An engine according to claim 15 in which the transfer channel means extends through a side wall of the housing.

22. An engine according to claim 14 in which two systems each comprising a combustion working chamber and a scavenge pump chamber are mounted on a common axis in the manner of a mirror image.

23. An engine according to claim 1 in which the piston runner means effects a differential control between the gas outlet means and the gas inlet means corresponding approximately to 15° of eccentric shaft rotation.

References Cited
UNITED STATES PATENTS

| | | |
|---|---|---|
| 1,434,446 | 11/1922 | McQueen. |
| 2,214,833 | 9/1940 | Hocker. |
| 3,226,013 | 12/1965 | Toyoda ____________ 123—8 X |

RALPH D. BLAKESLEE, *Primary Examiner.*

UNITED STATES PATENT OFFICE
CERTIFICATE OF CORRECTION

Patent No. 3,410,254                                                        November 12, 1968

Franz Huf

It is certified that error appears in the above identified patent and that said Letters Patent are hereby corrected as shown below:

Column 8, line 24, "Diesel" should read -- diesel --. Column 9, line 24, "AOUT" should read -- AÖ/UT --. Column 11, line 22, " π a" should read -- $\varphi$ a --. Column 12, line 53, claim reference numeral "8" should read -- 3 --; line 58, claim reference numeral "9" should read -- 3 --.

Signed and sealed this 10th day of March 1970.

(SEAL)
Attest:

Edward M. Fletcher, Jr.                                    WILLIAM E. SCHUYLER, JR.

Attesting Officer                                                          Commissioner of Patents